United States Patent [19]
Mobin

[11] Patent Number: 5,592,514
[45] Date of Patent: Jan. 7, 1997

[54] METHOD OF PERFORMING SIGNAL RECONSTRUCTION AT THE RECEIVING END OF A COMMUNICATIONS SYSTEM, SUCH AS FOR GSM

[75] Inventor: Mohammad S. Mobin, Whitehall, Pa.

[73] Assignee: Lucent Technologies Inc., Murray Hill, N.J.

[21] Appl. No.: 401,059

[22] Filed: Mar. 8, 1995

[51] Int. Cl.⁶ .............................. H03D 3/00; H04L 27/14; H04L 27/06
[52] U.S. Cl. ........................................... 375/336; 375/340
[58] Field of Search ..................................... 375/231, 341, 375/340, 329, 279, 305, 274, 336, 316, 259; 329/304; 370/110.1; 371/43

[56] References Cited

U.S. PATENT DOCUMENTS

| | | | |
|---|---|---|---|
| 5,029,186 | 7/1991 | Maseng et al. | 375/341 |
| 5,127,051 | 6/1992 | Chan et al. | 375/231 |
| 5,185,764 | 2/1993 | Baier | 375/231 |
| 5,199,047 | 3/1993 | Koch | 375/231 |
| 5,263,026 | 11/1993 | Parr et al. | 375/340 |
| 5,297,169 | 3/1994 | Backstrom et al. | 375/231 |
| 5,414,734 | 5/1995 | Marchetto et al. | 375/267 |
| 5,465,276 | 11/1995 | Larsson et al. | 375/346 |
| 5,467,374 | 11/1995 | Chennakeshu et al. | 375/340 |

OTHER PUBLICATIONS

Patent Application Serial No. 08/174933, Filed Dec. 1993, titled "Decreasing Length Tracebacks," D. M. Blaker et al.

Patent Application Serial No. 08/205961, Filed Mar. 2, 1994, titled "Viterbi Processor," D. M. Blaker et al.

"Design and Performance of Synchronization Techniques and Viterbi Adaptive Equalizers for Narrowband TDMA Mobile Radio," by G. D'Aria and V. Zingarelli, published in *Nordic Seminar on Digital Land Mobile Radio Communication*, 3rd Proceeding, Sep. 12–15th, 1988, Copenhagen.

"Two-Stage Doppler-Phasor-Corrected TCM/DMPSK for Shadowed Mobile Satellite Channels," by P. J. Mehane, *IEEE Trans. on Communications*, vol. 41, No. 8, Aug. 1993, 1137–1141.

"Maximum Likelihood Sequence Detection in the Presence of Intersymbol Interference," by G. D. Forney, Jr., *IEEE Trans. on Information Theory*, IT-18(3):363–378, May 1972.

"The Viterbi Algorithm," *IEEE Trans. on Information Theory*, Mar. 1973, 268–278.

Preliminary Data Sheet, Feb. 1994, *DSP1618 Digital Signal Processor*, published by AT&T Microelectronics, Allentown, PA, 1–157.

(List continued on next page.)

*Primary Examiner*—Tesfaldet Bocure

[57] ABSTRACT

The invention provides a method of performing signal reconstruction at the receiving end of a communications system that uses a discrete channel estimate of the communications channel for the communications system. The discrete channel estimate is obtained from received discrete signal samples, which have N discrete channel tap components, where N is a positive integer. One method includes the steps of: reconstructing a first discrete signal using N of the discrete channel tap components of the discrete estimate of the communications channel; and reconstructing a second discrete signal using the first reconstructed discrete signal and one of the N discrete channel tap components. Another method includes the steps of: reconstructing a first discrete signal using N of the discrete channel tap components of the discrete estimate of the communications channel; and reconstructing a second discrete signal from the first reconstructed discrete signal by complementing the first reconstructed discrete signal. Further, a binary digital signal processing system for performing signal reconstruction at the receiving end of a communications system includes a binary digital signal processor, a memory unit, and a signal bus. The binary digital signal processor can reconstruct a second discrete signal from a first reconstructed discrete signal and one of N discrete channel components or by complementing the first reconstructed discrete signal.

20 Claims, 4 Drawing Sheets

OTHER PUBLICATIONS

"Cellular Communication System," *IEE Proc.–Commun.*, vol. 141, No. 3, Jun. 1994, 168–176.

"Applying the Hamming Code to Microprocessor–Based Systems," Ernst L. Wall, *Electronics*, Nov. 22, 1979, 103–110.

"k=7 Multi–Code Rate Viterbi Decoder" Technical Data Sheet, *Q1650 Viterbi Decoder*, QUALCOMM, Oct. 1992, 1–51.

"Stanford Telecom ASIC & Custom Products Short Form Catalog," Seventh Edition, Jan. 1992, Santa Clara, CA, 1–59.

"Convolutional Encoder Viterbi Decoder STEL–2050," *Stanford Telecommunications*, Aug. 1992, 1–12.

"Viterbi Decoder STEL–2010," *Stanford Telecommunications*, Apr. 1992, 1–8.

"Convolutional Encoder Viterbi Decoder STEL–5269," *Stanford Telecommunications*, Apr. 1992, 1–12.

"Convolutional Encoder Viterbi Decoder STEL–2040," *Stanford Telecommunications*, May 1992, 1–14.

"Convolutional Encoding; Viterbi and Sequential Decoding," V. K. Bhargava et al., *Digital Communications By Satellite*, Chapter 12, Wiley–Interscience Pub., New York, 353–394.

"Viterbi Decoding Of Convolutional Codes," James J. Spilker, Jr., *Digital Communications by Satellite*, Chapter 15, Prentice–Hall, Inc., New Jersey, 455–472.

Patent application serial No. 08/401058, entitled "Method Of Compensating For Doppler Error In A Wireless Communications System, Such As For GSM And IS54," by M. S. Mobin, filed Mar. 8, 1995.

Patent application serial No. 08/357003, entitled "Oscillator Frequency Offset Error Estimator For A Wireless Communications System, Such As For Use With GSM," by M. S. Mobin, filed Dec. 16, 1994.

Patent application serial No. 08/356998, entitled "Coarse Frequency Burst Detector For A Wireless Communications System, Such As For Use With GSM," by M. S. Mobin, filed Dec. 16, 1994.

Patent application serial No. 08/357804, entitled "Coarse Frequency Burst Detector For A Wireline Communications System," by M. S. Mobin, filed Dec. 16, 1994.

Patent application serial No. 08/357802, entitled "Oscillator Frequency Offset Error Estimator For A Wireline Communications System," by M. S. Mobin, filed Dec. 16, 1994.

Patent application serial No. 08/153334, entitled "Efficient Utilization Of Present State/Next State Registers," by D. Blaker et al., filed Nov. 16, 1993.

Patent application serial No. 08/152531, entitled "Variable Length Tracebacks," by D. Blaker et al., filed Nov. 16, 1993.

Patent application serial No. 08/153333, entitled "Power And Time Saving Initial Tracebacks," by D. Blaker et al., filed Nov. 16, 1993.

Patent application serial No. 08/152805, entitled "Digital Receiver With Minimum Cost Index Register," by D. Blaker et al., filed Nov. 16, 1993.

Patent application serial No. 08/153405, entitled "Digital Processor And Viterbi Decoder Having Shared Memory,"by M. Diamondstein et al., filed Nov. 16, 1993.

Patent application serial No. 08/153391, entitled "Digital Signal Processor," by D. Blaker et al., filed Nov. 16, 1993.

Patent application serial No. 08/152807, entitled "Digital Signal Processor," by D. Blaker et al., filed Nov. 16, 1993.

Patent application serial No. 08/208156, entitled "Soft Symbol Decoding,", by D. Blaker et al., filed Mar. 8, 1994.

Patent application serial No. 08/205962, entitled "MLSE Before Derotation And After Derotation," by D. M. Blaker et al., filed Mar. 2, 1994.

FIG. 1

| VITERBI STATES: | $\hat{H}_2$ | $\hat{H}_1$ | $\hat{H}_0$ | REAL VECTORS: | $\hat{H}_2$ | $\hat{H}_1$ | $\hat{H}_0$ |
|---|---|---|---|---|---|---|---|
| $v_0$ | 0 | 0 | 0 | $\bar{b}_0$ | -1 | -1 | -1 |
| $v_1$ | 0 | 0 | 1 | $\bar{b}_1$ | -1 | -1 | 1 |
| $v_2$ | 0 | 1 | 0 | $\bar{b}_2$ | -1 | 1 | -1 |
| $v_3$ | 0 | 1 | 1 | $\bar{b}_3$ | -1 | 1 | 1 |
| $v_4$ | 1 | 0 | 0 | $\bar{b}_4$ | 1 | -1 | -1 |
| $v_5$ | 1 | 0 | 1 | $\bar{b}_5$ | 1 | -1 | 1 |
| $v_6$ | 1 | 1 | 0 | $\bar{b}_6$ | 1 | 1 | -1 |
| $v_7$ | 1 | 1 | 1 | $\bar{b}_7$ | 1 | 1 | 1 |

DISCRETE CHANNEL ESTIMATE

FIG. 2

$\hat{H}_2 = a_2 + b_2 i$ $\hat{H}_1 = a_1 + b_1 i$ $\hat{H}_0 = a_0 + b_0 i$ $\hat{S}_0 = \sum_{i=0}^{2} \hat{H}_i * \bar{b}_{0i}$ $= \hat{H}_0 * b_{00} + \hat{H}_1 * b_{01} + \hat{H}_2 * b_{02}$ $= \hat{H}_0 * (-1) + \hat{H}_1 * (-1) + \hat{H}_2 * (-1)$ $= -\hat{H}_2 - \hat{H}_1 - \hat{H}_0$ $= -(a_2 + a_1 + a_0) - (b_2 + b_1 + b_0)i$ $\hat{S}_1 = \sum_{i=0}^{2} \hat{H}_i * \bar{b}_{1i}$ $= -\hat{H}_2 - \hat{H}_1 + \hat{H}_0$ $= -(a_2 + a_1 - a_0) - (b_2 + b_1 - b_0)i$ $= \hat{S}_0 + 2\hat{H}_0$

FIG. 3

$$\hat{S}_0 = -\hat{H}_2 - \hat{H}_1 - \hat{H}_0$$

$$\hat{S}_7 = \sum_{i=0}^{2} \hat{H}_i * \bar{b}_{7i}$$

$$= \hat{H}_2 + \hat{H}_1 + \hat{H}_0$$

$$= (a_2 + a_1 + a_0) + (b_2 + b_1 + b_0)i$$

$$= -\hat{S}_0$$

FIG. 4

$$\hat{S}_0 = \hat{S}_0$$

$$\hat{S}_1 = \hat{S}_0 + 2\hat{H}_0$$

$$\hat{S}_2 = \hat{S}_0 + 2\hat{H}_1$$

$$\hat{S}_3 = \hat{S}_1 + 2\hat{H}_1$$

$$\hat{S}_4 = -\hat{S}_3$$

$$\hat{S}_5 = -\hat{S}_2$$

$$\hat{S}_6 = -\hat{S}_1$$

$$\hat{S}_7 = -\hat{S}_0$$

SIGNAL OR TRANSMISSION BURST

METHOD OF PERFORMING SIGNAL RECONSTRUCTION AT THE RECEIVING END OF A COMMUNICATIONS SYSTEM, SUCH AS FOR GSM

RELATED APPLICATION

This patent application is being filed concurrently with patent application Ser. No. 08/401,058, entitled "Method Of Compensating for Doppler Error In A Wireless Communications System, Such As For GSM And IS54," by M. S. Mobin, filed Mar. 8, 1995, (Moblin 18); co-pending patent application Ser. No. 08/357003, entitled "Oscillator Frequency Offset Error Estimator For A Wireless Communications System, Such As For Use With GSM," (Mobin 14) by M. S. Mobin, filed Dec. 16 1994; co-pending patent application Ser. No. 08/356998, entitled "Coarse Frequency Burst Detector For A Wireless Communications System, Such as For Use With GSM," (Mobin 15) by M. S. Mobin, filed Dec. 16, 1994; co-pending patent application Ser. No. 08/357804, entitled "Coarse Frequency Burst Detector For A Wireline Communications System," (Mobin 16) by M. S. Mobin, filed Dec. 16, 1994; co-pending patent application Ser. No. 08/357802, entitled "Oscillator Frequency Offset Error Estimator For A Wireline Communications System," (Mobin 17) by M. S. Mobin, filed Dec. 16, 1994; co-pending patent application Ser. No. 08/153334, entitled "Efficient Utilization Of Present State/Next State Registers," filed Nov. 16, 1993, by D. Blaker, M. Diamondstein, G. Ellard, M. Mobin and H. Sam, (Blaker 3-2-3-3-4-10); co-pending patent application Ser. No. 08/152531, entitled "Variable Length Tracebacks," filed Nov. 16, 1993, by D. Blaker, G. Ellard, and M. Mobin, (Blaker 4-4-4); co-pending patent application Ser. No. 08/153333, entitled "Power And Time Saving Initial Tracebacks," filed Nov. 16, 1993, by D. Blaker, G. Ellard, and M. Mobin, (Blaker 6-6-6); co-pending application Ser. No. 08/152805, entitled "Digital Receiver With Minimum Cost Index Register," filed Nov. 16, 1993, by D. Blaker, G. Ellard, M. Mobin and H. Sam, (Blaker 2-2-2-3); co-pending application Ser. No. 08/153405, entitled "Digital Processor And Viterbi Decoder Having Shared Memory," filed Nov. 16, 1993, by M. Diamondstein, H. Sam and M. Thierbach, (Diamondstein 1-2-8); co-pending application Ser. No. 08/153391, entitled "Digital Signal Processor," filed Nov. 16, 1993, by D. Blaker, G. Ellard and M. Mobin, (Blaker 1-1-1); co-pending application Ser. No. 08/152807, entitled "Digital Signal Processor," filed Nov. 16, 1993, by D. Blaker, G. Ellard, M. Thierbach, and M. Mobin, (Blaker 5-5-5-9); and co-pending application Ser. No. 08/208156, entitled "Soft Symbol Decoding," filed Mar. 8, 1994, by D. Blaker, G. Ellard, and M. Mobin, (Blaker 8-8-8), all of the foregoing assigned to the assignee of the present invention and herein incorporated by reference.

TECHNICAL FIELD

The present invention relates to communications and, more particularly, to signal reconstruction, such as for use in connection with communications system channel equalization.

BACKGROUND OF THE INVENTION

In a variety of communications systems, such as for example, wireless communications systems, a signal or signal burst is transmitted in which a portion of the signal burst transmitted is predetermined or known prior to transmission, referred to in this context as the "midamble," as illustrated in FIG. 6; however, a portion of the signal burst transmitted is also unknown. Typically, the known portion of the transmitted signal burst is received at the receiving end of the communications system, along with the unknown portion, and the known portion may then be employed to obtain an estimate of the communications channel for further signal processing of the unknown portion of the signal burst.

Such channel estimation is particularly useful in wireless communications systems employing modulation techniques in which binary digital signals or bits are encoded for transmission via a wireless medium. Examples of such modulation techniques include Minimum Phase Shift Keying (MSK) and Gaussian Minimum Phase Shift Keying (GMSK), although the invention is not limited in scope in this respect. Typically, a baseband modulated signal is applied to a carrier signal for transmission via the wireless medium. In this context, "a wireless communications system" refers to a communications system having a transmitting end and a receiving end in which signals are transmitted or communicated from the transmitting end to the receiving end via a signal path, a portion of the signal path from the transmitting end to the receiving end including signal transmission via a wireless medium.

Once a channel estimate is obtained at the receiving end of the communications system, typically an estimate of the signal transmitted is reconstructed from the dot product of the channel estimate with vectors representing the Viterbi states for the particular modulation scheme employed, where Viterbi decoding is employed at the receiving end of the communications system to perform equalization. Such an approach is computationally intensive, often resulting in more time than is desirable for signal processing. Furthermore, this processing may take place in an environment in which processing time is an important resource to be conserved. A need therefore exists for a more efficient method of performing signal reconstruction at the receiving end of a communications system.

SUMMARY OF THE INVENTION

Briefly, in accordance with one embodiment of the invention, a method of performing signal reconstruction at the receiving end of a communications system using a discrete channel estimate of the communications channel for the communications system, the discrete channel estimate being obtained from received discrete signal samples and having N discrete channel tap components, where N is a positive integer, comprises the steps of: reconstructing a first discrete signal using N of the discrete channel tap components of the discrete estimate of the communications channel; and reconstructing a second discrete signal using the first reconstructed discrete signal and one of the N discrete channel tap components.

In accordance with another embodiment of the invention, a method of performing signal reconstruction at the receiving end of a communications system using a discrete channel estimate of the communications channel for the communications system, the discrete channel estimate being obtained from received discrete signal samples and having N discrete channel tap components, where N is a positive integer, comprises the steps of: reconstructing a first discrete signal using N of the discrete channel tap components of the discrete estimate of the communications channel; and reconstructing a second discrete signal from the first reconstructed discrete signal by complementing the first reconstructed discrete signal.

In accordance with yet another embodiment, a binary digital signal processing system for performing signal reconstruction at the receiving end of a communications system comprises: a binary digital signal processor; a memory unit; and a signal bus. The binary digital signal processor is configured so as to reconstruct a second discrete signal from a first reconstructed discrete signal and one of N discrete channel components, N being a positive integer.

In accordance with still yet another embodiment, a binary digital signal processing system for performing signal reconstruction at the receiving end of a communications system comprises: a binary digital signal processor; a memory unit; and a signal bus. The binary digital signal processor includes means for reconstructing a second discrete signal from a first reconstructed discrete signal and one of N discrete channel components, N being a positive integer.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 1 is a table illustrating a discrete estimate of a communications channel comprising three (3) discrete channel tap components and illustrating eight (8) Viterbi states and eight (8) associated vectors, such as for a communications system in which Viterbi decoding is performed at the receiving end.

FIG. 2 is a set of mathematical equations illustrating at least in part a relationship between reconstructed signals for an embodiment of a method of performing signal reconstruction at the receiving end of a communications system in accordance with the invention using the communications channel estimate illustrated in FIG. 1.

FIG. 3 is a set of mathematical equations illustrating at least in part a relationship between reconstructed signals of an alternative embodiment of a method of performing signal reconstruction at the receiving end of a communications system in accordance with the invention using the communications channel estimate illustrated in FIG. 1.

FIG. 4 is a set of mathematical equations illustrating at least in part a relationship between reconstructed signals for yet another alternative embodiment of a method of performing signal reconstruction at the receiving end of a communications system in accordance with the invention using the communications channel estimate illustrated in FIG. 1.

DETAILED DESCRIPTION

Figure 6:
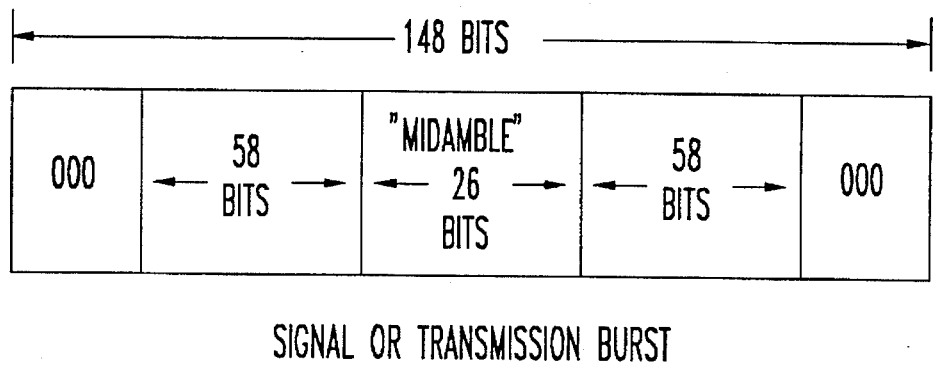
FIG. 6 is a diagram illustrating an embodiment of a signal burst or transmission, such as may be employed, for example, by the global system for mobile communications (GMS) standard.

As previously described, at the receiving end of a communications system, such as a wireless communications system, typically an estimate of the communications channel is obtained for further signal processing of received signals. In this context, the term "complex signal" or "complex signal sample" refers to an encoded digital symbol obtained as a complex discrete signal or signal sample at the receiving end of a communications system by sampling a baseband modulated analog signal. Depending on the modulation scheme employed, a symbol to be transmitted via the communications system may comprise a predetermined set of one or more binary digital signals or bits. Typically, a channel estimate may be obtained because a portion of the received signal burst is known prior to transmission. One such signal burst is illustrated in FIG. 6, for example, illustrating a signal burst or transmission burst such as may be employed in connection with the global system for mobile communications (GSM) standard, although the invention is not restricted in scope to a particular signal burst or communications signaling standard. The relevant known portion may be referred to as a "midamble" sequence in this context. Therefore, that portion of the received signal burst may be compared with the corresponding known portion of the transmitted signal burst in order to obtain an estimate of the communications channel, although the scope of the invention is not limited in this respect. Channel estimation is described in more detail, for example, in a variety of textbooks on communications. Three textbooks that describe discrete signal processing, such as may be employed for channel estimation, as well as Viterbi decoding include *Digital Communications*, by Lee and Messerschmitt, available from Kluwer Academic Publishers, 1992 (5th printing), *Digital Communications by Satellite*, by Bhargava, Haccoun, Matyas, and Nuspl, available from John Wiley & Sons, Inc., 1981, and *Digital Communications by Satellite*, by J. J. Spilker, Jr., available from Prentice-Hall, Inc., 1977, all of which are herein incorporated by reference. Channel estimation is also described in "Design and Performance of Synchronization Techniques and Viterbi Adaptive Equalizers for Narrowband TDMA Mobile Radio," by Giovanna D'Aria and Valerio Zingarelli, published in *Nordic Seminar on Digital Land Mobile Radio Communication*, 3rd Proceeding, Sep. 12–15, 1988, Copenhagen, herein incorporated by reference.

As indicated, at the receiving end of the communications channel, channel estimation may be conventional performed by cross-correlating the received discrete complex signal samples obtained with the known "midamble" sequence transmitted, although the invention is not limited in scope in this respect. Typically, a signal reconstruction process is then performed in which the dot product of the communications channel estimate is taken with vectors representing the Viterbi states for the particular modulation scheme being employed. By this process, complex signal samples representing the signals transmitted via the communications channel are estimated at the receiving end of the communications system. Such signal reconstruction is desirable for a variety of reasons, such as to provide signal correction at the receiving end of the communications system by comparing the reconstructed signals with the received signals. However, signal reconstruction based upon the dot product of the channel estimate is computationally intensive and often requires undesirably large amounts of processing time. Furthermore, in a typical hardware implementation, this approach to signal reconstruction may require extensive use of available memory, typically resulting in even more time than is desirable for signal processing in an environment in which signal processing time is typically an important resource to be conserved, such as in a mobile station for cellular digital telephony. For example, equation [1] below illustrates the conventional approach to performing signal reconstruction.

$$\hat{S}_j = \sum_{i=0}^{N} \hat{H}_i b_{ij} \quad [1]$$

where $\hat{S}_j$ is the discrete signal to be reconstructed, $\hat{H}_i$ are the discrete channel tap components of the channel estimate, and $b_{ij}$ is either +1 or −1 depending upon the particular Viterbi state for which the corresponding discrete signal is being reconstructed. As illustrated, a complex discrete signal estimate corresponding to each Viterbi state may be reconstructed from the dot product of the channel estimate with a real vector, $\bar{b}_j$, corresponding to the particular Viterbi state. The vector $\bar{b}_j$ comprises elements $b_{ij}$, where $b_{ij}$ is either +1 or −1, and is related to the Viterbi state to which it corresponds by replacing each −1 with zero, although the invention is not limited in scope in this respect, as explained below.

As previously indicated, the approach illustrated by equation [1] above may use excessive power, time and digital signal processor cycles, where a digital signal processor (DSP), for example, is employed. Furthermore, excessive power and time may be utilized due to the need to read the channel estimate from memory for each signal reconstruction performed. For example, in a typical hardware implementation, a DSP or other conventional signal processor may be coupled to memory, such as random access memory (RAM), by a signal bus. To implement equation [1], the DSP, for example, must read all the discrete channel tap components, $\hat{H}_i$, from RAM to perform signal reconstruction for each Viterbi state. Likewise, the DSP must generate $\bar{b}_j$ or, alternatively, read $\bar{b}_j$ from memory as well.

The DSP must then perform the computationally intensive signal multiplications and accumulations to reconstruct the desired signal. Likewise, as previously indicated, this must be performed for each signal to be reconstructed.

Alternatively, signal reconstruction in accordance with the invention may be performed, as described in more detail hereinafter. As previously described, a discrete channel estimate of a communications channel, such as including N discrete channel tap components, where N is a positive integer, may be obtained by conventional signal processing methods. Typically, discrete signal samples are received and these signal samples are processed to obtain the discrete channel estimate, as previously described. For example, FIG. 1 illustrates a table in which a discrete estimate of a communications channel having three (3) channel tap components is illustrated. Of course, the invention is not limited in scope to only three discrete channel tap components. Furthermore, in this particular embodiment, each discrete channel tap component $(b_0, b_1, \ldots, b_N)i$ in the communications channel estimate is complex. This is illustrated in FIG. 2 in which each discrete channel tap component $(a_0, a_1, \ldots, a_N)$ of the communications channel estimate is shown to have an imaginary component and a real component. FIG. 1 also illustrates vectors that may correspond to the Viterbi states associated with a particular communications system, such as a system using a conventional modulation scheme, such as, for example, a conventional form of phase shift keying. Thus, once the Viterbi states are known and the channel estimate is obtained, it is possible to perform signal reconstruction from the discrete estimate of the communications channel having N discrete channel tap components using the conventional approach.

Figure 5:
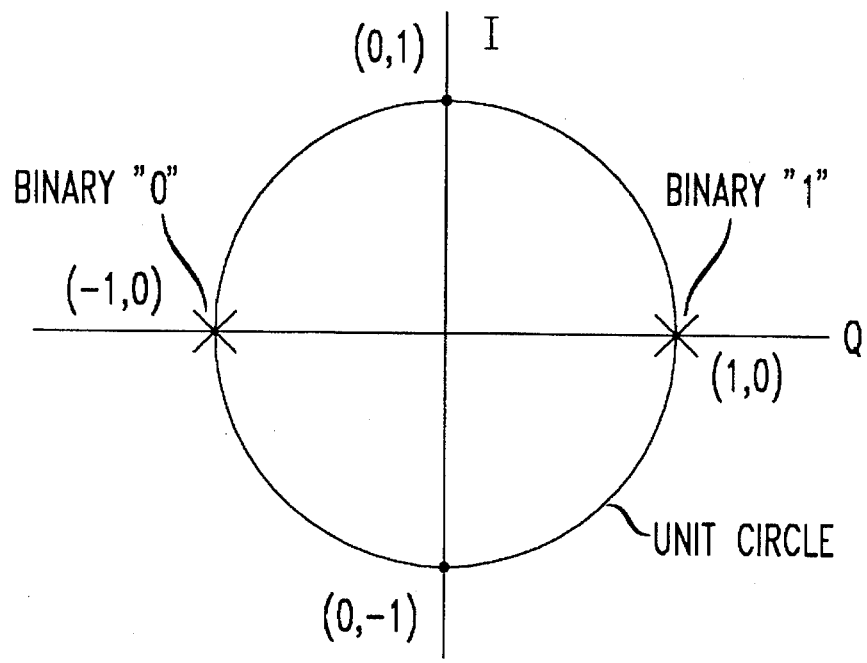
FIG. 5 is a plot of the inphase-quadrature (I-Q) plane illustrating the representation of binary digital signals as complex modulated signals in the I-Q plane, such as may be employed, for example, by the global system for mobile communications (SGM) standard.

However, previously described, it is desirable to perform this signal reconstruction in an efficient manner because such signal reconstruction is typically performed at the receiving end of a communications system, such as with a DSP or other signal processor, in which available computational resources and processing time are limited. For example, a DSP1618, available from AT&T Corp. and described in a preliminary datasheet, dated February 1994, also available from AT&T Corp. and herein incorporated by reference, may be employed, although the scope of the invention is not limited in this respect. As previously indicated, typically this signal reconstruction is obtained from the dot product of the channel estimate with a vector corresponding to the particular Viterbi state. For example, for a Viterbi state $V_0$, such as illustrated in FIG. 1, each "0" in the binary digital signal representation corresponding to state $V_0$ is translated as "−1" to obtain the vector $\bar{b}_o$ for application to the channel estimate in this particular illustration. Likewise, "1" in the Viterbi state remains or translates into "1" to obtain the vector $\bar{b}_j$, such as for state $V_1$ and $\bar{b}_1$ in this illustration. Therefore, conventionally, signal reconstruction for the Viterbi state $V_0$ is obtained from the dot product of the channel estimate with vector $\bar{b}_o$. This is depicted in greater detail in the portion of FIG. 2 in which conventional signal reconstruction for state $V_0$ is illustrated. For this particular embodiment of a method of performing signal reconstruction at the receiving end of a communications system in accordance with the invention, as explained in more detail hereinafter, "0" in the binary digital signal representation for a Viterbi state translates as a "−1" because in the Inphase-Quadrature (I-Q) plane, after processing received MSK modulated signal, for example, signal processing may be applied to the received signal so that a binary "1" is represented by 1 in the I-Q plane and a binary "0" is represented by −1 in the I-Q plane, as illustrated in FIG. 5. Of course, the scope of the invention is not limited in this respect. As illustrated in a portion of FIG. 2, vector $\bar{b}_1$ for Viterbi state $V_1$ is applied to the channel estimate to perform conventional signal reconstruction. For state $V_i$, however, in contrast with state $V_0$, discrete channel tap component $\bar{H}_0$ from the channel estimate is multiplied by 1 instead of −1 in the dot product due to the components of vector $\bar{b}_1$ in this illustration. Thus, as shown in FIG. 2, for this particular embodiment, one desirable aspect of a method of performing signal reconstruction at the receiving end of a communications system in accordance with the invention is that the discrete signal $\hat{S}_1$ corresponding to Viterbi state $V_1$ may be reconstructed from the discrete signal $\hat{S}_0$ corresponding to Viterbi state $V_0$ by a superposition with twice discrete channel tap component $\bar{H}_0$. More particularly, if a first reconstructed discrete signal, such as the discrete signal $\hat{S}_0$ corresponding to state $V_0$, is obtained using N, in this particular example 3, of the discrete channel tap components of the estimate of the communications channel, then a second reconstructed discrete signal $\hat{S}_1$, in this example corresponding to state $V_1$, may be reconstructed using the first reconstructed discrete signal and only one of the N discrete channel tap components, in this case $\hat{H}_0$, which is one of the three discrete channel tap components in this example.

A method of performing signal reconstruction in accordance with the invention may therefore provide significant processing efficiency over the conventional approach when employed at the receiving end of a communications system. Once the first discrete signal is reconstructed, the second discrete signal may be reconstructed using the first reconstructed discrete signal by, for example, performing a read from memory, in comparison with reading the entire channel estimate, such as for a hardware implementation of the conventional approach, as previously described. After reading the one discrete channel tap component, a superposition of twice that particular discrete channel tap component with the first reconstructed discrete signal may be formed, for example. This is both computationally less intensive and more efficient in comparison with the conventional technique. For example, in the hardware implementation previously described including a DSP or other signal processor, such as a DSP1618, coupled by a signal bus to a RAM or other memory unit, once the reconstructed signal $\hat{S}_0$ corresponding to state $V_0$ is formed, $\hat{S}_1$ may be formed by reading discrete channel tap component $\hat{H}_0$ from memory and accumulating twice the respective real and imaginary components for $\hat{H}_0$ with the first reconstructed signal using the DSP.

As illustrated, once one of the discrete signals corresponding to a Viterbi state is constructed or reconstructed, another discrete signal corresponding to a second Viterbi state may be reconstructed more efficiently. Likewise, once two discrete signals corresponding to the Viterbi states are reconstructed, such as previously described, another two discrete signals corresponding to two more Viterbi states may also be reconstructed efficiently. This is illustrated in FIG. 4 where, in this particular example, the discrete signals corresponding to states $V_2$ and $V_3$ may be reconstructed from the discrete signals corresponding to states $V_0$ and $V_1$. Furthermore, these discrete signals may be reconstructed by again obtaining only one of the N discrete channel tap components from memory and superpositioning it twice, or alternatively, superpositioning twice the one channel tap component with the previously reconstructed discrete signals, as FIG. 4 illustrates. Again, this would be more efficient for a hardware implementation, such as one including a DSP, for example.

In addition to these computational savings and efficiencies, FIG. 3 also illustrates yet another advantage of a method of performing signal reconstruction in accordance with the invention. Although it is possible to perform signal reconstruction for the Viterbi states associated with a modulation scheme for a communications system in accordance with the approach just discussed, once one-half of the Viterbi states for a particular modulation scheme have had corresponding discrete signals reconstructed by the previously described efficient signal processing approach, the discrete signals corresponding to the remaining states may be reconstructed without obtaining any additional discrete channel tap components of the channel estimate from memory. This is illustrated in more detail in FIG. 3.

As illustrated, the reconstructed discrete signal $\hat{S}_0$ corresponding to state $V_0$ is shown. Likewise, in a portion of FIG. 4, the reconstructed discrete signal $\hat{S}_7$ corresponding to state $V_7$ is obtained employing the conventional technique. However, as further illustrated in FIG. 4, this particular reconstructed discrete signal also corresponds to the complement of the reconstructed discrete signal corresponding to state $V_0$. Thus, for an embodiment of a method of performing signal reconstruction in accordance with the invention, once a first discrete signal has been reconstructed using the discrete signal components of the estimate of the communications channel, a second discrete signal may be reconstructed by complementing the first reconstructed discrete signal. In a conventional DSP or other similar hardware, such as the DSP1618 available from AT&T Corp., complementing a discrete signal stored in a binary digital signal format is extremely efficient in comparison to the cumbersome conventional approach of reading from memory and performing successive signal multiplications and accumulations, as previously described. For example, the discrete signal may be applied to an exclusive OR gate, as described in more detail hereinafter. Likewise, as previously suggested, this technique may be combined with the technique previously described to result in additional efficiencies in signal processing in comparison with the conventional approach. More particularly, once a channel estimate is obtained and the Viterbi states are determined for the particular modulation scheme, it is possible to perform signal reconstruction with a DSP or other signal processor, for example, for one-half of the states using the channel estimate in accordance with the method previously described that is more efficient and faster than the conventional approach. Furthermore, once one or more reconstructed discrete signals are obtained, the reconstructed discrete signals for the remaining states may also be obtained, using the DSP or other signal processor, without the need to obtain any of the discrete channel tap components of the channel estimate from memory.

Figure 7:
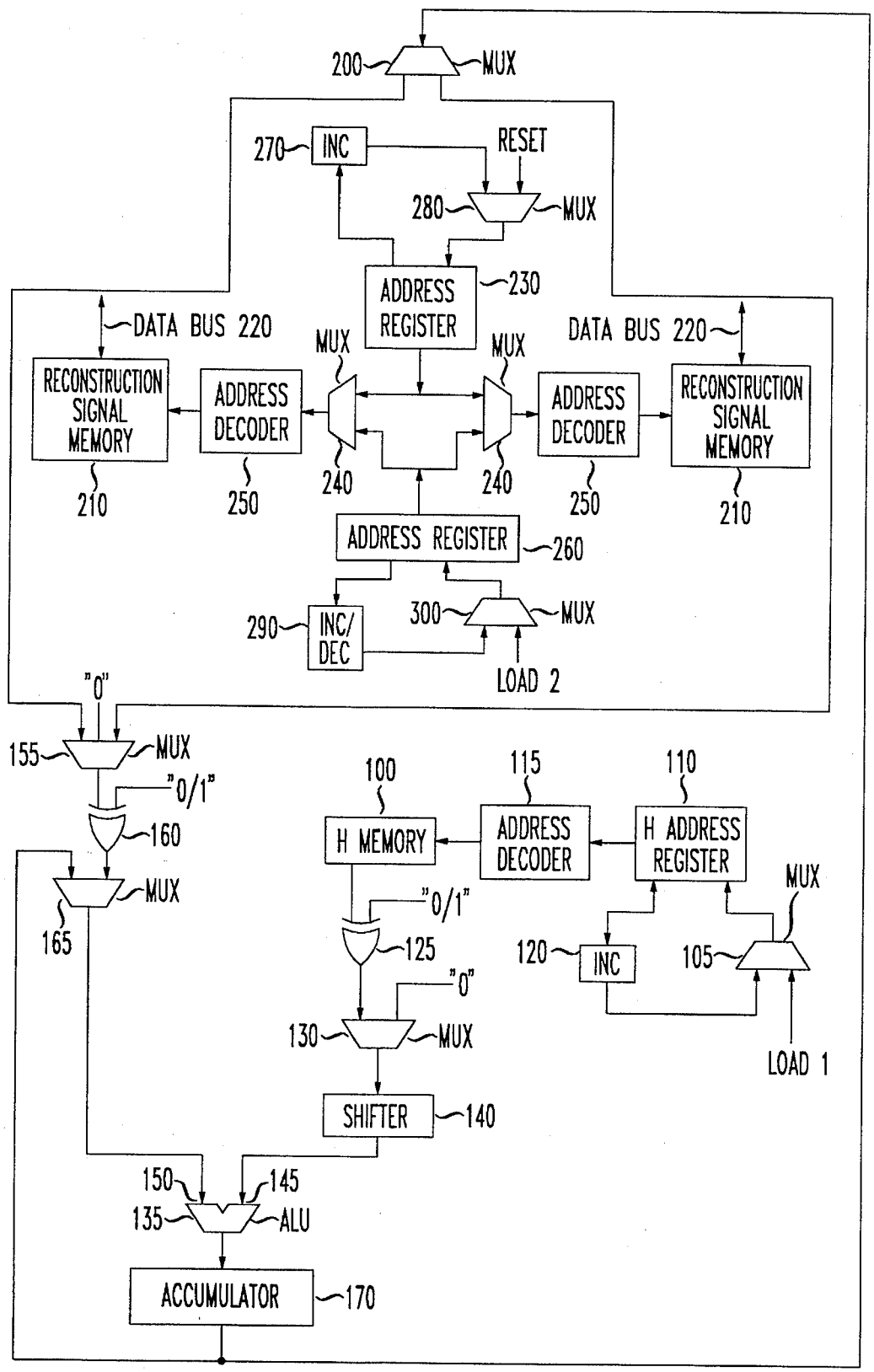
FIG. 7 is a block diagram illustrating an embodiment of a system for performing signal reconstruction at the receiving end of a communications system in accordance with the invention.

FIG. 7 is a block diagram illustrating one embodiment of a system for performing signal reconstruction at the receiving end of a communications system that may be employed to perform an embodiment of a method of performing signal reconstruction at the receiving end of a communications system in accordance with the invention. It will, of course, be appreciated that the invention is not restricted in scope to the particular embodiment illustrated in FIG. 7. Any one of a number of different system embodiments may be employed to perform a method of performing signal reconstruction in accordance with the invention and the invention is not limited in scope to any particular system.

The first discrete signal may be reconstructed from the N discrete channel tap components of the estimate of the communications channel, as previously described. For example, the channel tap components, $H_i$ (i.e., $a_0+(b_0)i$, ..., $a_N+(b_N)i$) may be stored in a memory, such as memory 100 illustrated in FIG. 7. Likewise, this first discrete signal may be reconstructed using address register 110. As illustrated, a first memory location address may be loaded via MUX 105 into the address register, for example. This address may be provided to address decoder 115, which then directly addresses memory 100. Likewise, as illustrated in FIG. 7, on successive clock cycles of an externally-derived clock pulse (not shown), address register 110 may be incremented by 120, as illustrated in FIG. 7. Likewise, as illustrated, the contents of the memory location in memory 100 indicated by address decoder 115 may be provided to an input port of exclusive OR gate 125. As illustrated, a "0" or "1" may likewise be provided to another input port of the exclusive OR gate depending upon the desired operation. For example, if a "1" is provided for the input port the signal output of an exclusive OR gate, such as gate 125, comprises a "one's" complement of the binary digital signal provided to the gate by memory 100. Likewise, this output signal of gate 125 may then be provided via MUX 130 to arithmetic logic unit (ALU) 135. As illustrated, this binary digital signal is provided to input port 145 of ALU 135 via shifter or shift register 140. At this point in the signal processing, shift register 140 does not shift the binary digital signal provided. Nonetheless, shifter 140 may shift binary digital signals provided to it by memory 100 via gate 125 and MUX 130 in later processing, as described in more detail hereinafter. At approximately the same time this binary digital signal stored in memory 100 is provided to input port 145 of ALU 135, a "0" input may be provided to input port 150 via MUX 155, exclusive OR gate 160 and MUX 165. Again, at this particular point in the signal processing, a "0" may be provided to an input port of exclusive OR gate 160 so that the signal provided to the other input port of the exclusive OR gate is also passed to MUX 165. Therefore, the binary digital signals provided to ALU 135 may be accumulated by accumulator 170. In response to an externally-derived clock pulse, 120 may then increment the address provided to address register 110, as previously described, in order to address the next channel tap component stored in memory 100. As previously described, this next channel tap component may be complemented by exclusive OR gate 125 and provided to input port 145 of ALU 135. However, at this point in the signal processing, the current contents of accumulator 170, based at least in part upon the previous channel tap component, may be provided to input port 150 of ALU 135 via MUX 165. Thus, after accumulation by ALU 135, accumulator 170 may have as its contents the sum of the "one's" complement of the first two channel tap components, such as $\hat{H}_0$ and $\hat{H}_1$, for example. It will now be appreciated by one skilled in the art that this process may be repeated until all of the stored channel tap components are complemented and accumulated in accumulator 170. Likewise, it is assumed, for this particular embodiment, that memory 100 has been providing the real components of the channel tap components and that this process may likewise be repeated for the imaginary components the channel tap components, also stored in memory 100.

Once the first discrete signal is reconstructed from the discrete channel tap components of the estimate of the communications channel, the second discrete signal may be reconstructed from the first reconstructed discrete signal and one of the discrete channel tap components, as explained in more detail hereinafter. Address register 260 may be employed to designate or address the portions of memory, such as random access memory, to contain or state the reconstructed discrete signals. For example, once accumulator 170 contains the first reconstructed signal, the contents of accumulator 170 may be read into reconstruction signal memory 210 from accumulator 170 via MUX 200 and databus 220. Thus, the desired memory address location for storage may be indicated by address register 260 via MUX 240 and address decoder 250. Once this first reconstructed discrete signal is stored in memory 210 it may later be read from memory 210 using address register 230 to designate the portions of memory to address again via MUX 240 and address decoder 250. This first reconstructed discrete signal may thus be provided to ALU 135, more particularly input port 150 of ALU 135, via databus 220, MUX 155, exclusive OR gate 160 and MUX 165. In order to reconstruct the second discrete signal, the other signal provided to an input port of exclusive OR gate 160 may comprise a "0" so that the first reconstructed discrete signal is passed to input port 150 by gate 160 without being complemented. It will likewise now be appreciated by one skilled in the art that address register 230 may be addressed by increment 270 and MUX 280 in the manner previously described for address register 110, increment 120, and MUX 105. At approximately the same time that the first reconstructed signal is provided to input port 150, one of the N channel taps may be provided to input port 145 of ALU 135. Again, this may be accomplished by employing address register 110 to designate the particular memory location for the desired channel tap component and this channel tap component may be provided by memory 100 to exclusive OR gate 125. At this particular point in the signal processing, in comparison with the signal processing previously performed, in order to reconstruct the first discrete signal, the signal provided to the other input port of exclusive OR gate 125 may comprise a "0". Thus, the channel tap component may be provided via MUX 130 to shift register 140. Now, at this point in the signal processing, shift register 140 may be employed to shift the channel tap component and thereby, in effect, multiply it or double it before it is provided to input port 145. Thus, by providing the first reconstructed discrete signal to input port 150 and twice one of the channel tap components to input port 145, accumulator 170 may contain the second reconstructed discrete signal. Likewise, as previously described, the second reconstructed discrete signal may now be stored at a designated memory location in memory 210 in the manner previously described with respect to the first reconstructed discrete signal. Once two reconstructed discrete signals are stored in memory 210, it is possible, in the manner previously described, to reconstruct two more discrete signals. More specifically, the first and second reconstructed discrete signals may be provided to input port 150 while another channel tap component may be provided to input port 145 so that third and fourth reconstructed discrete signals may be accumulated in accumulator 170 and, likewise, stored in memory locations of memory 210. It will now be appreciated that address register 260 may be employed to indicate or designate the destination memory location address of a reconstructed discrete signal to be transferred from accumulator 170 to memory, whereas address register 230 may be employed to indicate or designate the memory location address of a reconstructed discrete signal to be provided from memory 210 to input port 150 via MUX 155. Nonetheless, although in FIG. 7 databus 220, memory 210, address decoder 250, and MUX 240 are each indicated by more than one block to facilitate illustration of addressing by registers 230 and 260, in a hardware implementation, these components may to be shared, such as in a dual port memory, or dual port random access memory and addressed by a single decoder and a single MUX for both reading from and writing to memory.

In an alternative embodiment of a method of performing signal reconstruction at the receiving end of a communications system in accordance with the invention, after the first discrete signal has been reconstructed from N of the discrete channel tap components of the estimate of the communications channel, as previously described, alternatively a second discrete signal might be reconstructed by complementing the first reconstructed discrete signal, as described in more detail hereinafter. Specifically, once the first reconstructed discrete signal is stored in memory 210, address register 230 may designate the appropriate memory location so that the first reconstructed discrete signal may be provided to input port 150 via MUX 155, exclusive OR gate 160, and MUX 165, as previously described. However, in this particular embodiment, instead of providing a "0" to the other input port of exclusive OR gate 160 as the other input signal, alternatively a "1" may be provided. Therefore, the discrete signal provided to MUX 155 may be complemented and provided to MUX 165. The complemented first reconstructed discrete signal may then be provided to input port 150 of ALU 135. Likewise, as illustrated in FIG. 7, a "0" may be provided via MUX 130 and shifter 140 to input port 145. Thus, accumulator 170 may contain the complemented first reconstructed discrete signal, which in this particular embodiment comprises the second reconstructed discrete signal. Likewise, the second reconstructed discrete signal may further be stored in memory 210 via MUX 200. Likewise, the appropriate memory location in which to store the second reconstructed discrete signal may again be indicated by address register 260 which may now be provided using increment/decrement 290 and MUX 300.

While only certain features of the invention have been illustrated and described herein, many modifications, substitutions, changes or equivalents will now occur to those skilled in the art. It is, therefore, to be understood that the appended claims are intended to cover all such modifications and changes as fall within the true spirit of the invention.

The invention claimed is:

1. A method of performing signal reconstruction at the receiving end of a communications system using a discrete channel estimate of the communications channel for the communications system, the discrete estimate being obtained from received discrete signal samples and having N discrete channel tap components, where N is a positive integer, said method comprising the steps of:

reconstructing a first discrete signal using N of the discrete channel tap components of the estimate of the communications channel; and reconstructing a second discrete signal using the first reconstructed discrete signal and using one of the N discrete channel tap components.

2. The method of claim 1, and further comprising the step of:

reconstructing a third discrete signal using a reconstructed discrete signal selected from the group of reconstructed discrete signals consisting essentially of said first reconstructed discrete signal and said second reconstructed discrete signal and using one other of the N discrete channel tap components.

3. The method of claim 2, and further comprising the step of:

reconstructing a fourth discrete signal by complementing a discrete signal selected from the group of discrete signals consisting essentially of said first reconstructed discrete signal, said second reconstructed discrete signal, and said third reconstructed discrete signal.

4. The method of claim 1, wherein said first reconstructed discrete signal and said second reconstructed discrete signal each correspond to states of a signal modulation scheme employed to transmit binary digital signals from the transmitting end to the receiving end of a wireless communications system via the communications channel.

5. The method of claim 4, wherein the signal modulation scheme comprises minimum phase-shift keying (MSK) modulation.

6. The method of claim 1, wherein the discrete estimate of the communications channel is stored in a memory;

wherein the step of reconstructing a first discrete signal comprises:

reading N of the discrete channel tap components of the estimate of the communication channel from the memory; and accumulating a superposition of the N discrete channel tap components using, for each discrete channel tap component, a discrete channel tap component selected from the group of discrete channel tap components consisting essentially of the discrete channel tap component and its complement.

7. The method of claim 6, where the superposition of the N discrete channel tap components is accumulated using an arithmetic logic unit (ALU).

8. The method of claim 6, wherein the superposition of the N discrete channel tap components is accumulated using a digital signal processor (DSP).

9. The method of claim 6, wherein the superposition of the N discrete channel tap components is accumulated by respectively accumulating the real and imaginary components of the N discrete channel tap components.

10. The method of claim 6, wherein the step of reconstructing a second discrete signal comprises:

reading the one of the N discrete channel tap signal components from the memory; and accumulating a superposition of the first reconstructed discrete signal and a discrete channel tap component selected from the group of discrete channel tap components consisting essentially of the one of the N discrete channel tap components, its complement, twice the one of the N discrete channel tap components, and twice its complement.

11. A method of performing signal reconstruction at the receiving end of a communications system using a discrete channel estimate of the communications channel for the communications system, the discrete estimate being obtained from received discrete signal samples and having N discrete channel tap components, where N is a positive integer, said method comprising the steps of:

reconstructing a first discrete signal using N of the discrete channel tap components of the estimate of the communications channel; and reconstructing a second discrete signal by complementing the first reconstructed discrete signal.

12. The method of claim 11, and further comprising the step of:

reconstructing a third discrete signal using a reconstructed discrete signal selected from the group of reconstructed discrete signals consisting essentially of said first reconstructed discrete signal and said second reconstructed discrete signal and using one other of the N discrete channel tap components.

13. The method of claim 11, wherein said first reconstructed discrete signal and said second reconstructed discrete signal each correspond to states of a signal modulation scheme employed to transmit binary digital signals from the transmitting end to the receiving end of a wireless communications system via the communications channel.

14. The method of claim 13, wherein the signal modulation scheme comprises minimum phase-shift keying (MSK) modulation.

15. The method of claim 11, wherein the discrete estimate of the communications channel is stored in a memory;

wherein the step of reconstructing a first discrete signal comprises:

reading N of the discrete channel tap components of the estimate of the communication channel from the memory; and accumulating a superposition of the N discrete channel tap components using, for each discrete channel tap component, a discrete channel tap component selected from the group of channel tap components consisting essentially of the discrete channel tap component and its complement.

16. The method of claim 15, wherein complementing the first reconstructed discrete signal is performed using an exclusive OR gate.

17. A binary digital signal processing system for performing signal reconstruction at the receiving end of a communications system, said system comprising:

a binary digital signal processor;

a memory containing, stored in predetermined memory locations, a first reconstructed discrete signal and N discrete channel tap components of a discrete channel estimate of the communications system, N being a positive integer; and a signal bus coupling said binary digital signal processor to said memory unit;

said binary digital signal processor being configured so as to reconstruct a second discrete signal from the first reconstructed discrete signal and one of the N discrete channel tap components.

18. The binary digital signal processing system of claim 17, wherein said binary digital signal processor is further configured so as to reconstruct a third discrete signal from the complement of the first reconstructed discrete signal.

19. A binary digital signal processing system for performing signal reconstruction at the receiving end of a communications system, said system comprising:

a binary digital signal processor;

a memory containing, stored in predetermined memory locations, a first reconstructed discrete signal and N discrete channel tap components of a discrete channel estimate of the communications system, N being a positive integer; and a signal bus coupling said binary digital signal processor to said memory unit;

said binary digital signal processor comprising means for reconstructing a second discrete signal from the first reconstructed discrete signal and one of the N discrete channel tap components.

20. The binary digital signal processing system of claim 19, wherein said binary digital signal processor further comprises means for reconstructing a third discrete signal from the complement of the first reconstructed discrete signal.

* * * * *